(12) United States Patent
Odell

(10) Patent No.: US 7,923,973 B2
(45) Date of Patent: Apr. 12, 2011

(54) METHOD AND APPARATUS TO REDUCE LINE CURRENT HARMONICS FROM A POWER SUPPLY

(75) Inventor: Arthur B. Odell, Cupertino, CA (US)

(73) Assignee: Power Integrations, Inc., San Jose, CA (US)

(*) Notice: Subject to any disclaimer, the term of this patent is extended or adjusted under 35 U.S.C. 154(b) by 352 days.

(21) Appl. No.: 12/210,854

(22) Filed: Sep. 15, 2008

(65) Prior Publication Data

US 2010/0067270 A1    Mar. 18, 2010

(51) Int. Cl.
*G05F 1/70* (2006.01)
*G05F 1/575* (2006.01)
(52) U.S. Cl. .................. 323/207; 323/284; 323/285
(58) Field of Classification Search ............ 323/205, 323/207, 282, 284, 285; 363/44, 89
See application file for complete search history.

(56) References Cited

U.S. PATENT DOCUMENTS

| | | |
|---|---|---|
| 4,437,146 A | 3/1984 | Carpenter |
| 4,940,929 A | 7/1990 | Williams |
| 5,047,912 A | 9/1991 | Pelly |
| 5,285,367 A | 2/1994 | Keller |
| 5,313,381 A | 5/1994 | Balakrishnan |
| 5,446,366 A | 8/1995 | Bassett et al. |
| 5,461,303 A | 10/1995 | Leman et al. |
| 5,502,370 A | 3/1996 | Hall et al. |
| 5,532,918 A | 7/1996 | Mayrand et al. |
| 5,602,465 A | 2/1997 | Clemente |
| 5,612,597 A | 3/1997 | Wood |
| 5,644,214 A | 7/1997 | Lee |
| 5,734,564 A | 3/1998 | Brkovic |
| 5,742,151 A | 4/1998 | Hwang |
| 5,747,977 A | 5/1998 | Hwang |
| 5,804,950 A | 9/1998 | Hwang et al. |
| 5,867,379 A | 2/1999 | Maksimovic et al. |
| 5,886,586 A | 3/1999 | Lai et al. |
| 5,982,639 A | 11/1999 | Balakirshnan |
| 6,005,781 A | 12/1999 | Balakirshnan |
| 6,043,633 A | 3/2000 | Lev et al. |

(Continued)

FOREIGN PATENT DOCUMENTS

| | | |
|---|---|---|
| EP | 1 387 476 A1 | 2/2004 |
| JP | 06 153496 A | 5/1994 |

OTHER PUBLICATIONS

Hwang, et al., "New Universal Control Methods for Power Factor Correction and DC to DC Converter Applications," IEEE, 1997, pp. 59-65 (7 pages).

(Continued)

*Primary Examiner* — Gary L Laxton
(74) *Attorney, Agent, or Firm* — Blakely Sokoloff Taylor & Zafman, LLP

(57) ABSTRACT

A method and apparatus for controlling a power converter. In one aspect, a controller for use in a power converter includes a first calculator coupled to determine an end of an on time of a power switch of the power converter by integrating an input current to output an on time signal representative of the end of the on time of the power switch. The controller also includes a second calculator coupled to determine an end of an off time of the power switch by integrating a difference between an input voltage and an output voltage to output an off time signal representative of the end of the off time of the power switch.

27 Claims, 12 Drawing Sheets

U.S. PATENT DOCUMENTS

| | | | |
|---|---|---|---|
| 6,049,473 | A | 4/2000 | Jang et al. |
| 6,075,295 | A | 6/2000 | Li |
| 6,198,638 | B1 | 3/2001 | Lee |
| 6,212,079 | B1 | 4/2001 | Balakrishnan et al. |
| 6,227,157 | B1 | 5/2001 | Baumgartner et al. |
| 6,259,614 | B1 | 7/2001 | Ribarich et al. |
| 6,304,462 | B1 | 10/2001 | Balakrishnan et al. |
| 6,313,976 | B1 | 11/2001 | Balakrishnan et al. |
| 6,351,398 | B1 | 2/2002 | Balakrishnan et al. |
| 6,356,464 | B1 | 3/2002 | Balakrishnan et al. |
| 6,366,481 | B1 | 4/2002 | Balakrishnan et al. |
| 6,373,734 | B1 | 4/2002 | Martinelli |
| 6,438,003 | B1 | 8/2002 | Balakrishnan et al. |
| 6,452,366 | B1 | 9/2002 | Hwang |
| 6,462,971 | B1 | 10/2002 | Balakrishnan et al. |
| 6,531,854 | B2 | 3/2003 | Hwang |
| 6,617,805 | B2 | 9/2003 | Ribarich et al. |
| 6,657,417 | B1 | 12/2003 | Hwang |
| 6,728,121 | B2 | 4/2004 | Ben-Yaakov et al. |
| 6,768,655 | B1 | 7/2004 | Yang et al. |
| 6,803,730 | B2 | 10/2004 | Nadd et al. |
| 6,839,247 | B1 | 1/2005 | Yang et al. |
| 6,900,623 | B2 | 5/2005 | Yang et al. |
| 6,903,536 | B2 | 6/2005 | Yang |
| 6,934,168 | B2 | 8/2005 | Thiery et al. |
| 6,952,354 | B1 | 10/2005 | Yang et al. |
| 6,956,336 | B2 | 10/2005 | Ribarich |
| 6,958,920 | B2 * | 10/2005 | Mednik et al. .................. 363/19 |
| 6,967,851 | B2 | 11/2005 | Yang et al. |
| 7,057,440 | B2 | 6/2006 | Yang et al. |
| 7,064,527 | B2 * | 6/2006 | Adragna ....................... 323/207 |
| 7,068,016 | B2 | 6/2006 | Athari |
| 7,078,870 | B2 | 7/2006 | Bocchiola |
| 7,088,081 | B2 | 8/2006 | Takahashi et al. |
| 7,116,090 | B1 | 10/2006 | Yang et al. |
| 7,148,664 | B2 | 12/2006 | Takahashi et al. |
| 7,157,886 | B2 | 1/2007 | Agarwal et al. |
| 7,164,590 | B2 | 1/2007 | Li et al. |
| 7,164,591 | B2 | 1/2007 | Soldano |
| 7,180,273 | B2 | 2/2007 | Bocchiola et al. |
| 7,256,569 | B2 | 8/2007 | Wu et al. |
| 7,269,038 | B2 | 9/2007 | Shekhawat et al. |
| RE40,016 | E | 1/2008 | Ribarich et al. |
| 7,616,459 | B2 | 11/2009 | Huynh et al. |
| 7,643,322 | B1 * | 1/2010 | Varga et al. ..................... 363/97 |
| 7,750,615 | B2 * | 7/2010 | Jung et al. ..................... 323/282 |
| 2004/0113594 | A1 | 6/2004 | Athari et al. |
| 2006/0061337 | A1 | 3/2006 | Kim et al. |
| 2007/0085523 | A1 | 4/2007 | Scoones et al. |
| 2007/0145956 | A1 | 6/2007 | Takeuchi |
| 2007/0159141 | A1 | 7/2007 | Shih |
| 2007/0241730 | A1 | 10/2007 | Dow et al. |
| 2008/0310196 | A1 | 12/2008 | Lin |
| 2009/0115400 | A1 | 5/2009 | Hunter |
| 2009/0206668 | A1 | 8/2009 | Dawes |

OTHER PUBLICATIONS

International Rectifier, IR1150(S)(PbF), IR1150I(S)(PbF), "μPFC One Cycle Control PFC IC," Data Sheet No. PD60230 revC, Feb. 5, 2007, pp. 1-16.
"Application Note 42047: Power Factor Correction (PFC) Basics," Fairchild Semiconductor Corp., Rev. 0.9.0, Aug. 19, 2004, pp. 1-11.
"Application Note AN42009 (ML AN33): ML4824 Combo Controller Applications," Fairchild Semiconductor Corp., Rev. 1.0.3, Feb. 5, 2002, pp. 1-10.
Brown, R. et al., "One Cycle Control IC Simplifies PFC Designs," Proceedings of the Twentieth Annual IEEE Applied Power Electronics Conference and Exposition, vol. 2, Mar. 6-10, 2005, pp. 825-829.
Brown, R. et al., "Application Note AN-1077: PFC Converter Design with IR1150 One Cycle Control IC," Rev. 2.3, Jun. 2005, pp. 1-18, cover.
Buso, S. et al., "Simplified Control Techniques for High-Power-Factor Flyback Cuk and Sepic Rectifiers Operating in CCM," IEEE Transactions on Industry Applications, vol. 36, No. 5, Sep./Oct. 2000, pp. 1413-1418.
"CM6903A: Low Pin Count PFC/PWM Controller Combo," Champion Microelectronic Corp., Rev. 1.4, Oct. 20, 2008, pp. 1-15.
"FAN4803: 8-Pin PFC and PWM Controller Combo," Rev. 1.2.3, Nov. 2, 2004, pp. 1-12.
"FAN4810: Power Factor Correction Controller," Rev. 1.0.12, Sep. 24, 2003, pp. 1-14.
Hwang, J. et al., "New Universal Control Methods for Power Factor Correction and DC to DC Converter Applications," Proceedings of the Twelfth Annual IEEE Applied Power Electronics Conference and Exposition, vol. 1, Feb. 23-27, 1997, pp. 59-65.
"IR1150(S)(PbF); IR1150I(S)(PbF): μPFC One Cycle Control PFC IC," International Rectifier, Data Sheet No. PD60230, Rev. C, Feb. 5, 2007, pp. 1-16.
"L4981A; L4981B: Power Factor Corrector," ST Microelectronics, Nov. 2001, pp. 1-16.
"L6562A: Transition-Mode PFC Controller," ST Microelectronics, Rev. 3, Aug. 2007, pp. 1-26.
"ML4821: Power Factor Controller," Micro Linear Corporation, May 1997, pp. 1-12.
"ML4824: Power Factor Correction and PWM Controller Combo," Fairchild Semiconductor Corp., Rev. 1.0.6, Nov. 7, 2003, pp. 1-15.
"ML4861: Low Voltage Boost Regulator," Micro Linear Corporation, Oct. 1996, pp. 1-11.
"NCP1651: Single Stage Power Factor Controller," ON Semiconductor, Rev. 7, Jan. 2008, pp. 1-32.
"NCP1652: High-Efficiency Single Stage Power Factor Correction and Step-Down Controller," ON Semiconductor, Rev. 0, Jun. 2008, pp. 1-34.
Rim, G.-H. et al., "A Simplified Analog Converter for Power Factor Correction Converters," IEEE Transactions on Industrial Electronics, vol. 42, No. 4, Aug. 1995, pp. 417-419.
EP 09 17 5287—European Search Report, dated May 10, 2010, 2 pages.
EP 09 17 5256—European Search Report, dated May 11, 2010, 2 pages.
Maksimović, D. et al., "Nonlinear-Carrier Control for High-Power-Factor Boost Rectifiers," IEEE Transactions on Power Electronics, vol. 11, No. 4, Jul. 1996, pp. 578-584.
Smedley, K. et al., "One-Cycle Control of Switching Converters," Proceedings of the 22nd Annual IEEE Power Electronics Specialists Conference, Jun. 1991, pp. 888-896.
Tang, W. et al., "Charge Control: Modeling, Analysis, and Design," IEEE Transactions on Power Electronics, vol. 8, No. 4, Oct. 1993, pp. 396-403.
Zane, R. et al., "A Mixed-Signal ASIC Power-Factor-Correction (PFC) Controller for High Frequency Switching Rectifiers," Proceedings of the 30th Annual IEEE Power Electronics Specialists Conference, vol. 1, Jun. 1999, pp. 117-122.
Zane, R. et al., "Modeling of High-Power-Factor Rectifiers Based on Switching Converters with Nonlinear-Carrier Control," Proceedings of the 27th Annual IEEE Power Electronics Specialists Conference, vol. 2, Jun. 1996, pp. 1105-1111.
Zane, R. et al., "Nonlinear-Carrier Control for High-Power-Factor Rectifiers Based on Up-Down Switching Converters," IEEE Transactions on Power Electronics, vol. 13, No. 2, Mar. 1998, pp. 213-221.

* cited by examiner

METHOD AND APPARATUS TO REDUCE LINE CURRENT HARMONICS FROM A POWER SUPPLY

BACKGROUND

1. Field of the Disclosure

The present invention relates generally to power supplies, and more specifically, the invention relates to reducing the input current harmonics of a power supply.

2. Background

Power supplies are typically used to convert alternating current ("AC") power provided by an electrical outlet into usable direct current ("DC") power for an electrical device. One important consideration for power supply design is the power quality, or in other words the efficiency with which power is delivered to the power supply. More specifically, power quality may be quantified by a power factor, which is a ratio of the amount of usable power delivered to the power supply divided by total power delivered to the power supply. Usable power may be defined as power that is used by the load coupled to the output of the power supply. Total power is the sum of usable and unusable power delivered to the power supply. Unusable power may be defined as power that is delivered to the load but not used by the load and returned back to the input of the power supply.

During power supply operation, it is beneficial to have a high power factor (majority of total power is usable power) to increase efficiency. Unusable power delivered causes an additional dissipation of power due to an increased current when transferring power through the power supply. Additionally, electrical components in the power supply may need to be designed to receive the higher currents to deliver the same amount of power to the load which may increase cost and size of the power supply.

One aspect that contributes to additional unusable power is distortions in the current and/or voltage waveform delivered by the power distribution system. Typically, these distortions of current and/or voltage may be the result of electromagnetic interference coupled during transmission of power through the distribution lines. In order to design efficient power supplies it is important to increase power quality of the incoming power into the power supply. A common method to increase power quality of incoming power to the power supply is to use a boost converter to transform the current waveform back to its ideal sinusoidal shape.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
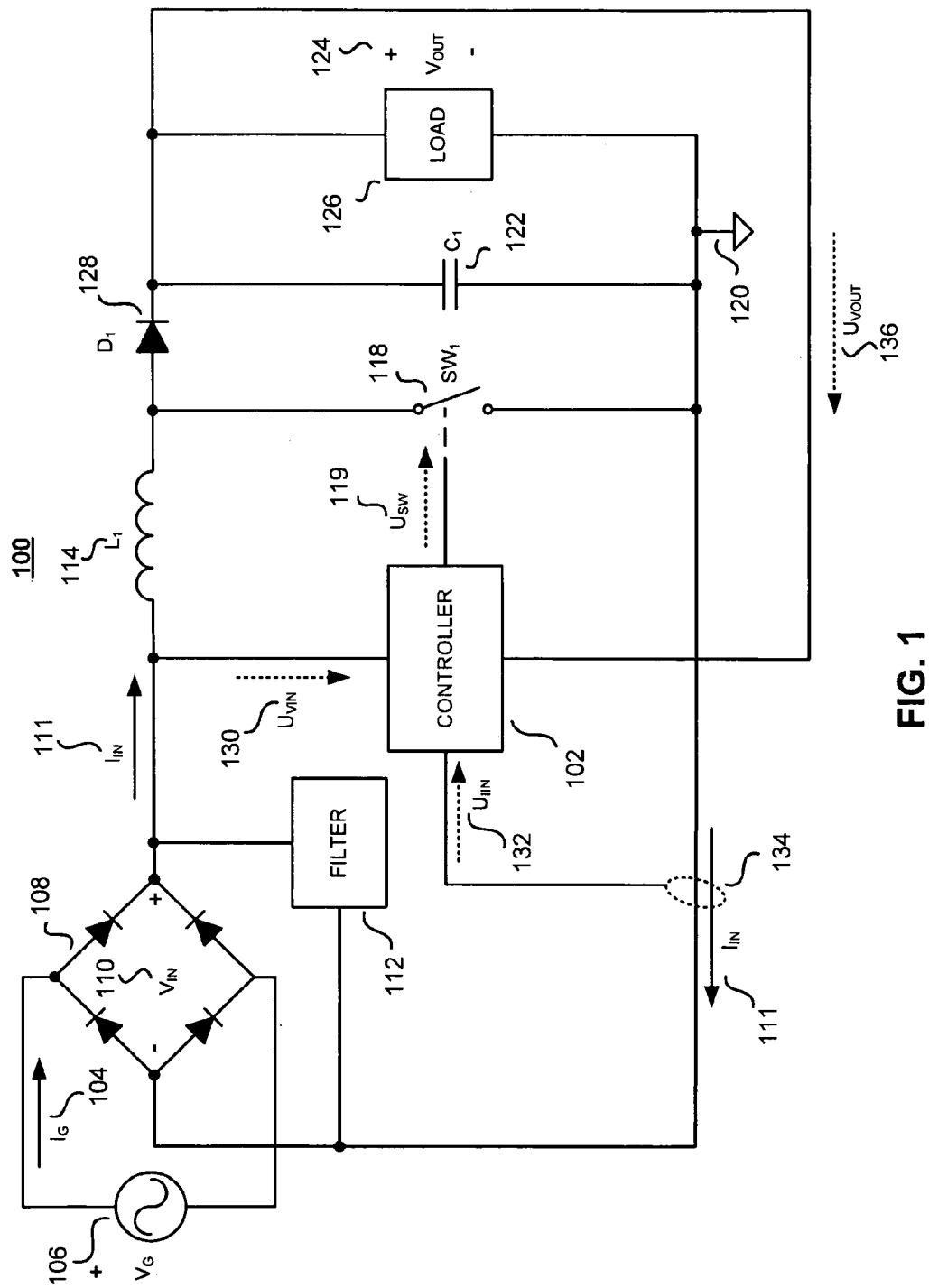
FIG. 1 illustrates an example schematic of a boost converter including an example controller in accordance with the teachings of the present invention.

In one aspect of the present invention, methods and apparatuses disclosed here for explanation purposes use a power converter to limit line current harmonics. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples.

As will be discussed below, various examples in accordance with the teachings of the present invention allow a power converter to employ a control technique to shape an input current waveform of the power converter. In the examples discussed, the input current waveform is controlled to be proportional to an input voltage waveform by varying an on time and an off time of a power switch in the power converter. More specifically, the control technique forces the on time of the power switch to be inversely proportional to a rectified time-varying input voltage $V_{IN}(t)$ by setting a constant volt-seconds for the off time. The off-time is controlled to be a constant product of $(V_{OUT}-V_{IN}) \times T_{OFF}$. In particular, integrating the quantity $V_{OUT}-V_{IN}$ during the off time allows for a constant volt-seconds to be set during the off time. By setting the off time to have a constant volt-seconds, the on-time volt-seconds is forced to be substantially constant over a few switching cycles in order to maintain a volt-second balance that satisfies the properties of a boost inductor. A balance of volt-seconds on the boost inductor allows the on-time to be substantially inversely proportional to the input voltage. This relationship of on-time to input voltage sets up a convenient and simple means for controlling the input current as a function of the rectified time varying input voltage $V_{IN}(t)$ which is representative of the input line voltage. If the input current is sensed by integrating the input current during the on time, the on time can be terminated by reaching a constant integral value of $$\int_{T1}^{T2} I_{INPUT} dt$$

(where the duration from T1 to T2 is the on time) as determined by the substantially constant feedback signal over a few switching cycles. This will cause average input current over a switching cycle to be substantially proportional to the input voltage. This concept will be explained in accordance with the Figures described below.

To illustrate, FIG. 1 is a functional block diagram of an example power converter 100 including a controller 102 in accordance with the teachings of the present invention. In the example shown, power converter 100 is a boost power converter that receives an AC line current $I_G$ 104 which corresponds with an AC line voltage $V_G$ 106. Typically, AC line current $I_G$ 104 and corresponding AC line voltage $V_G$ 106 are provided by an electrical distribution system (e.g., power plant) through an electrical socket). As shown, a bridge rectifier 108 converts AC line voltage $V_G$ 106 to a DC input voltage $V_{IN}$ 110.

Figure 3:
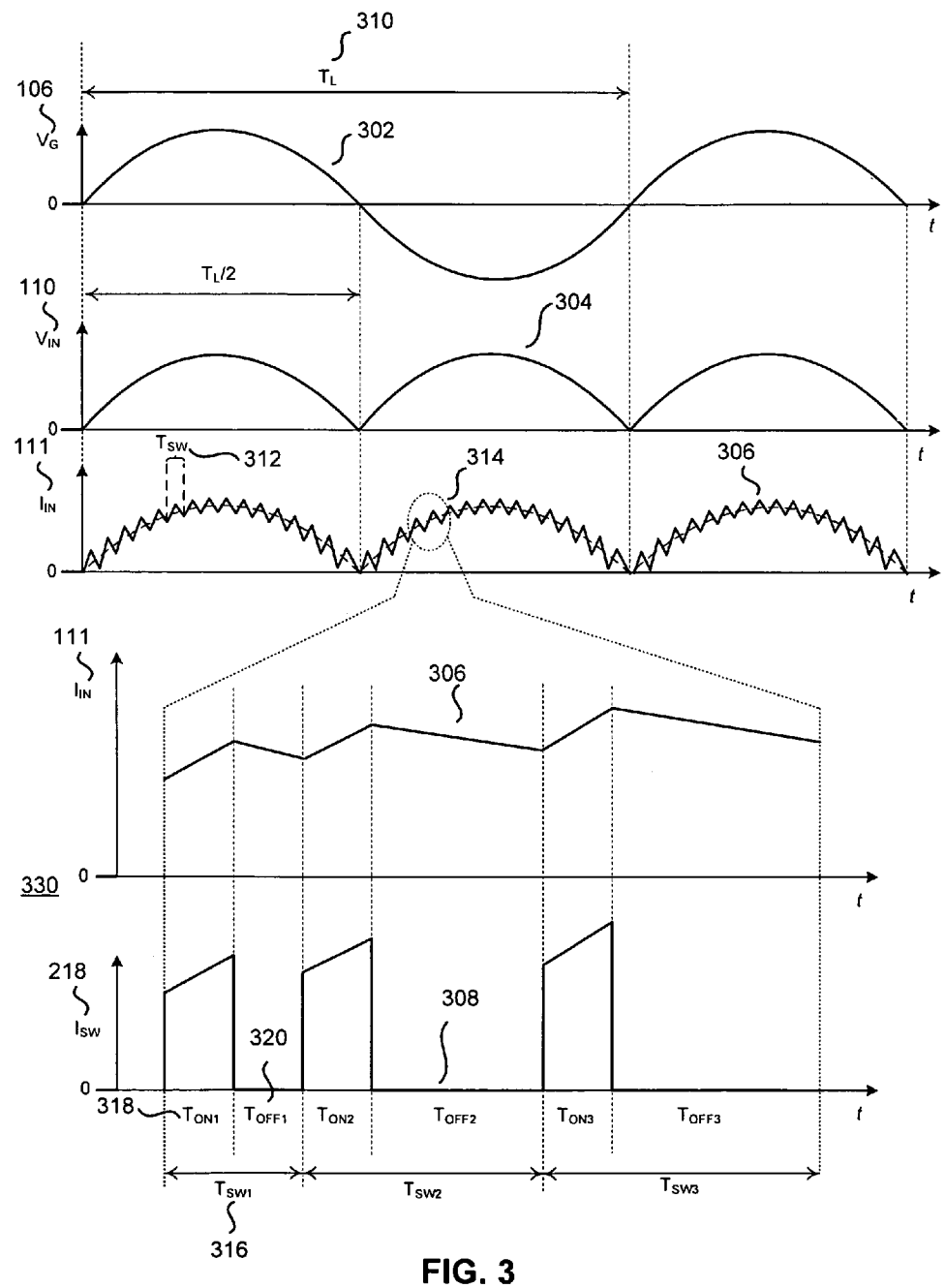
FIG. 3 illustrates example input and switch current waveforms associated with FIGS. 1 and 2 in accordance with the teachings of the present invention.

Referring now to FIG. 3, example waveforms 302, 304, and 306 are representative of AC line voltage 106, DC input voltage $V_{IN}$ 110, and DC input current $I_{IN}$ 111, respectively. As shown, an 'AC' waveform is denoted by a waveform that reverses its polarity at certain intervals. For example, AC line voltage $V_G$ 106 is represented by waveform 302 that alternates between a positive value and a negative value. In comparison, a 'DC' waveform is denoted by a waveform that is always the same polarity. For example, as illustrated by waveforms 304 and 306, DC input voltage $V_{IN}$ 110 and a DC input current $I_{IN}$ 111 are substantially always positive. Note that DC input voltage $V_{IN}$ 110 and DC input current $I_{IN}$ 111 vary in magnitude with time.

Referring back to FIG. 1, in the example shown, a filter 112 is coupled across bridge rectifier 108 to filter high frequency noise currents from DC input current $I_{IN}$ 111. In one aspect of the invention, DC input current $I_{IN}$ 111 is substantially controlled to form a proportional relationship with DC input voltage $V_{IN}$ 110. As shown in FIG. 3, a proportional relationship is created when waveform 306 representative of DC input current $I_{IN}$ 111 generally follows a shape of waveform 304 representative of DC input voltage $V_{IN}$ 110

As shown in the example of FIG. 1, an energy storage element, shown as an inductor $L_1$ 114, is coupled to controller 102 at one end and a power switch $SW_1$ 118 at an opposite end. In operation, power switch $SW_1$ 118 is in an 'on' or 'closed' state when switch 118 is able to conduct current and in an 'off' or 'open' state when switch 118 in unable to conduct current. In the example, an input return 120 is coupled to power switch $SW_1$ 118. In operation, the energy storage inductor $L_1$ 114 transfers energy to an output of the power converter 100 in response to the switching of switch $SW_1$ 118 in accordance with the teachings of the present invention.

As shown in the example, a bulk capacitor 122 is coupled to supply a substantially constant output voltage $V_{OUT}$ 124 to a load 126. In one example, load 126 may be an input to a DC-DC power supply. A diode $D_1$ 128 is coupled such that current from bulk capacitor 122 is prevented from flowing back through inductor $L_1$ 114. In the example of FIG. 1, an input voltage signal $U_{VIN}$ 130, representative of DC input voltage $V_{IN}$ 110, is received by controller 102. In one example, input voltage signal $U_{VIN}$ 130 may be derived due to the inherent properties of the boost converter as will be discussed in conjunction with FIG. 2B and 2C. As shown, an input current sense signal $U_{IIN}$ 132, representative of DC input current $I_{IN}$ 111, is also received by controller 102. More specifically, a current sense 134 such as for example, a current transformer, or a voltage across a discrete resistor, or a voltage across a transistor when the transistor is conducting, may be used to measure DC input current $I_{IN}$ 111. In the example of FIG. 1, an output voltage signal $U_{VOUT}$ 136, representative of output voltage $V_{OUT}$ 124, is also received by controller 102. In one example, output voltage signal $U_{VOUT}$ 136 may be representative of a constant reference value. According to the example teachings of the present invention, sense signals $U_{VIN}$ 130, $U_{IIN}$ 132, and $U_{VOUT}$ 136 may be in the form of a voltage or a current.

In one example, controller 102 outputs a switching signal $U_{SW}$ 119 that controls a switching of switch $SW_1$ 118 in response to the input voltage signal $U_{VIN}$ 130, the input current signal $U_{IIN}$ 132, and the output voltage signal $U_{VOUT}$ 136 in order to regulate the output voltage $V_{OUT}$ 124 and control the DC input current $I_{IN}$ 111 to be proportional to DC input voltage $V_{IN}$ 110, also referred to as 'input voltage $V_{IN}$ 110.' More specifically, in the example shown, controller 102 regulates output voltage $V_{OUT}$ 124 and controls DC input current $I_{IN}$ 111 by controlling each switching cycle of switch $SW_1$ 118. A switching cycle is defined as a time period when the switch is on and a subsequent time period when the switch is off. For example, a switching cycle may include an on time period when switch $SW_1$ 118 is able to conduct, followed by an off time period when switch $SW_1$ 118 is unable to conduct. In another example, a switching cycle may include an off time period when switch $SW_1$ 118 is unable to conduct, followed by an on time period when switch $SW_1$ 118 is able to conduct. An on-time may be defined as the time period switch $SW_1$ 118 is conducting during a switching cycle and an off-time may be defined as the time period switch $SW_1$ 118 is not conducting during a switching cycle.

According to the teachings of the present invention, controller 102 employs a variable frequency switching method by actively adjusting the on time and off time of the switch $SW_1$ 118 to control the DC input current $I_{IN}$ 111. In particular, the on-time of a switching cycle is regulated in response to the output voltage signal $U_{VOUT}$ 136 that is assumed to be substantially constant over several switching cycles and the off-time of a switching cycle is set by a constant value representative of a volt-second magnitude. Due to the natural tendency of an inductor to maintain a volt-second balance during a steady state condition, switch $SW_1$ 118 is obligated to substantially maintain a similar volt-second balance during the on-time. By integrating the input current signal $U_{IIN}$ 132 during the on-time and allowing the off time to have constant volt-seconds, the input current $I_{IN}$ 111 is forced to become proportional to the input voltage $V_{IN}$ 110. This allows for DC input current $I_{IN}$ 111 to track or follow the DC input voltage $V_{IN}$ 110 during each line cycle 310. In this manner, switch $SW_1$ 118 is controlled by controller 102 to regulate the output voltage $V_{OUT}$ 124 of power converter 100 and control DC input current $I_{IN}$ 111 such that it is substantially linearly proportional to DC input voltage $V_{IN}$ 110.

Figure 2A:
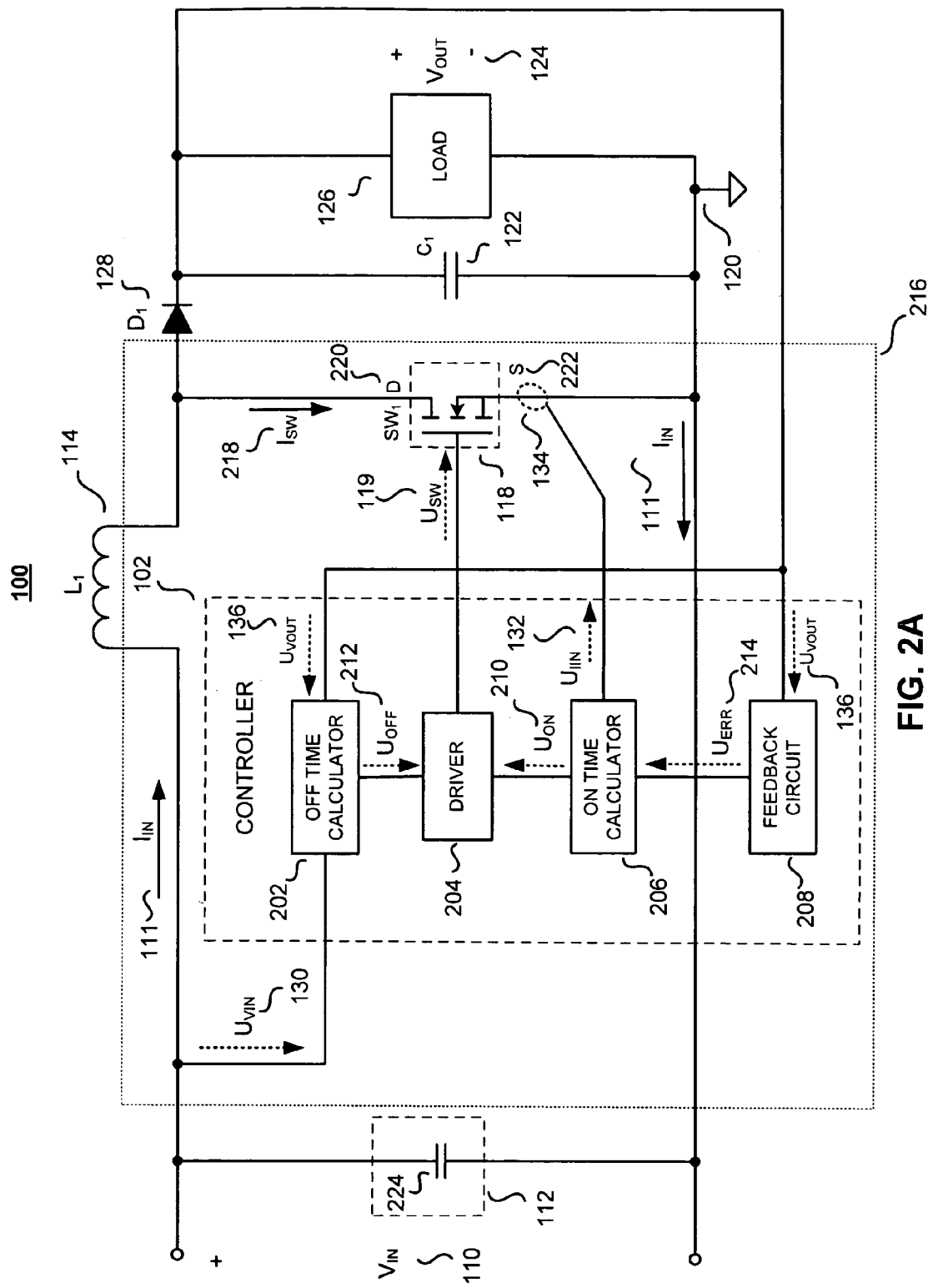
FIG. 2A is a functional block diagram illustrating an example controller of FIG. 1 in accordance with the teachings of the present invention.

Referring now to FIG. 2A, a functional block diagram of power converter 100 further illustrates an example of controller 102 of FIG. 1 in accordance with the teachings of the present invention. As shown, the controller 102 includes an off time calculator 202, a driver 204, an on time calculator 206, and a feedback circuit 208. According to the example of FIG. 2A, the on time calculator 206 determines an amount of time switch $SW_1$ 118 is able to conduct current in a switching cycle, also referred to as the 'on time.' In operation, as an example, the on time calculator 206 will output an on time signal $U_{ON}$ 210, which indicates an end of an on time in a switching cycle, in response to input current signal $U_{IIN}$ 132. In the example of FIG. 2A, when the on time signal $U_{ON}$ 210 is output to driver 204, switching signal $U_{SW}$ 119 is adjusted accordingly to turn switch $SW_1$ 118 off. In this manner, the on time calculator 206 regulates the on time of a switching cycle.

In the example of FIG. 2A, the off time calculator 202 determines the amount of time switch $SW_1$ 118 is unable to conduct current in a switching cycle, also referred to as the 'off time.' In operation, in response to the input voltage signal $U_{VIN}$ 130 and output voltage signal $U_{VOUT}$ 136, the off time calculator 202 will output an off time signal $U_{OFF}$ 212, which indicates the end of the off time in a switching cycle. In the example of FIG. 2A, when the off time signal $U_{OFF}$ 212 is output to driver 204, switching signal $U_{SW}$ 119 is adjusted accordingly to turn switch $SW_1$ 118 on. In this manner, the off time calculator 202 regulates the off time of the switching cycle. The driver 204 controls switching of switch $SW_1$ 118 through switching signal $U_{SW}$ 119. In one example, when switching signal $U_{SW}$ 119 is high, switch $SW_1$ 118 is on and when switching signal $U_{SW}$ 119 is low, switch $SW_1$ 118 is off. Thus, according to the example, driver 204 is coupled to switch switch $SW_1$ 118 from an on state to an off state in response to the on time signal $U_{ON}$ 210 and to switch switch $SW_1$ 118 from the off state to the on state in response to the off time signal $U_{OFF}$ 212. Thus, in the example, driver 204 regulates the output voltage $V_{OUT}$ 124 at the output of power converter 100.

As shown in the example of FIG. 2A, a feedback circuit 208 outputs an error signal $U_{ERR}$ 214 in response to output voltage signal $U_{VOUT}$ 136. More specifically, the error signal $U_{ERR}$ 214 gives an indication of the output voltage of the power converter 100. According to the teachings of the present invention, the error signal $U_{ERR}$ 214 is designed to have a substantially slower response time in comparison to the switching signal $U_{SW}$ 119. For example, in one embodiment, error signal $U_{ERR}$ 214 is an averaged value representative of an averaged magnitude of output voltage $V_{OUT}$ 124 over several line cycles such that output voltage $V_{OUT}$ 124 is considered a substantially constant value when controlling the input current over a line cycle.

As shown, controller 102, current sense 134, and switch $SW_1$ 118 may be included in an integrated circuit 216. In one example, switch $SW_1$ 118 may be included on a same single monolithic device as controller 102. In an alternate example, controller 102 may be included on a single monolithic device without switch $SW_1$ 118. In one example, switch $SW_1$ 118 may be a metal oxide semiconductor field effect transistor (MOSFET). In operation, switch $SW_1$ 118 allows conduction of current from a drain terminal 220 to a source terminal 222 when the switch $SW_1$ 118 is on and substantially prevents conduction of current when the switch $SW_1$ 118 is off. In another example, current sense 134 may be coupled to the switch $SW_1$ 118 to measure a switch current $I_{SW}$ 218 as shown in FIG. 2A. Since switch current $I_{SW}$ 218 is substantially equal to DC input current $I_{IN}$ 111 during the on time of a switching cycle, switch current $I_{SW}$ 218 may be sensed instead of DC input current $I_{IN}$ 111 during the on time of a switching cycle. As shown, current sense 134 may sense input current $I_{IN}$ 111 at the source terminal 222 of power switch SW1 218. In an altnerative embodiment current sense 134 may sense input current $I_{IN}$ 111 at the drain terminal 220 of power switch SW1 218. In an alternate embodiment, switch current $I_{SW}$ 218 may be sensed by current sense 134 before drain terminal 220 or after source terminal 222.

As shown in the depicted example, filter 112 includes, but is not limited to, a capacitor 224 that filters high frequency noise from DC input current $I_{IN}$ 111. More specifically, in one example, a capacitance value of capacitor 224 is a value picked such that capacitor 224 may filter out high frequency noise, but is not large enough to reduce the time varying component of DC input voltage $V_{IN}$ 110.

Figure 2B:
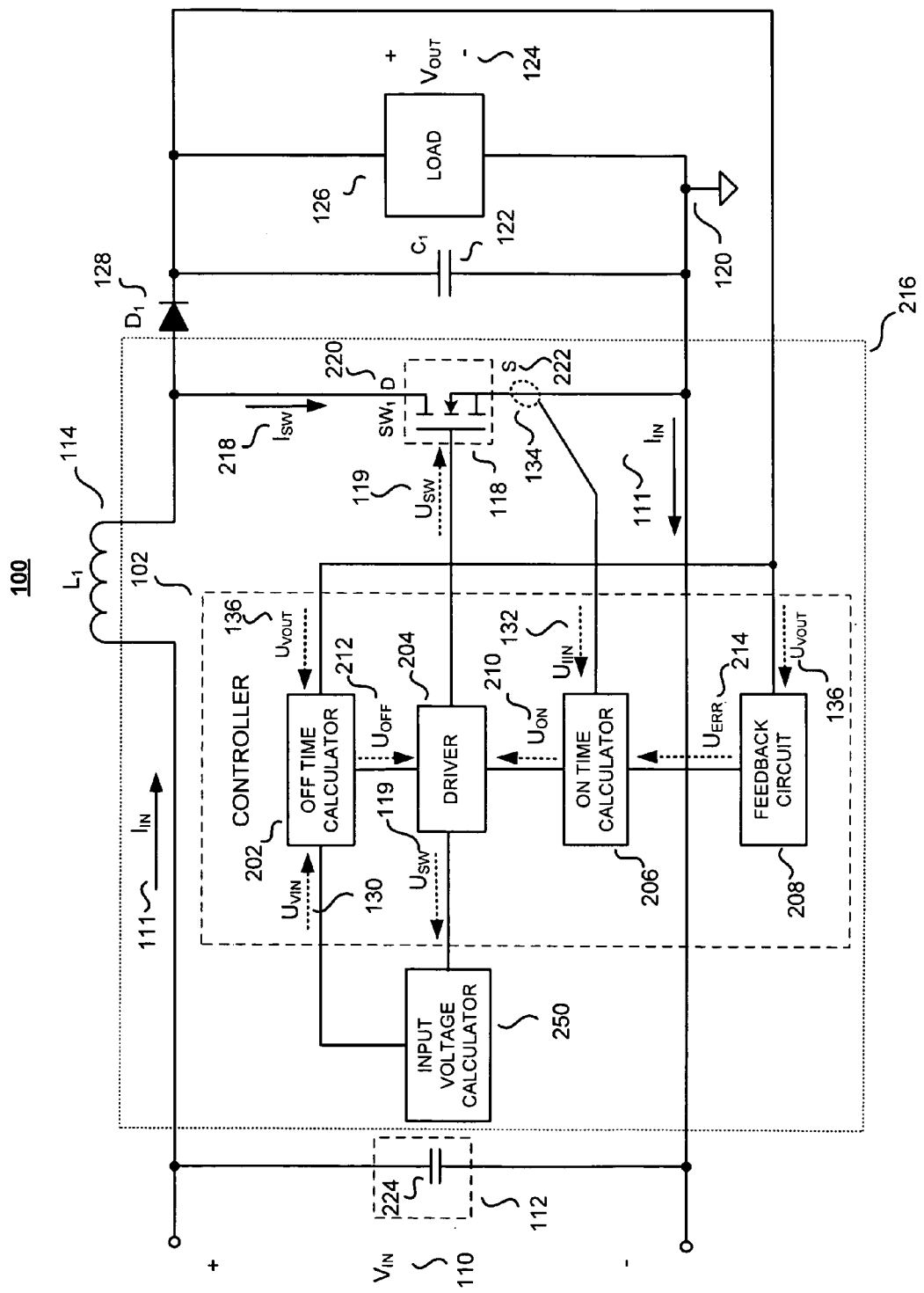
FIG. 2B is a functional block diagram illustrating an example controller of FIG. 1 in accordance with the teachings of the present invention.

Referring now to FIG. 2B, an alternate functional block diagram of the power converter 100 further illustrates an example of controller 102 of FIG. 1 in accordance with the teachings of the present invention. As shown, an input voltage calculator 250 calculates the input voltage $V_{IN}$ 110 in response to switching signal $U_{SW}$ 119. Due to the properties of the boost converter topology, a certain relationship exists between a duty factor D of the power switch $SW_1$ 118 and the input voltage $V_{IN}$ 110. This relationship may be exploited by using the duty factor D to calculate the input voltage value $V_{IN}$ 110. A duty factor is defined as the percentage of time the power switch $SW_1$ 118 is conducting over a period of time. The duty factor D may be defined by equation 1 as follows:

$$D = \frac{T_{ON}}{T_{TOTAL}} = \frac{T_{ON}}{T_{ON} + T_{OFF}} \qquad \text{EQ. 1}$$

Where $T_{ON}$ is representative of the time power switch SW1 118 is closed (conducting), $T_{TOTAL}$ is a certain time period, and $T_{OFF}$ is representative of the time power switch $S_{W1}$ 118 is open (not conducting). Due to the inherent properties of a boost converter a specific theoretical relationship between input voltage, output voltage, on time, and off time exists, as shown below:

$$V_{IN} \times T_{ON} = (V_{OUT} - V_{IN}) \times T_{OFF} \therefore V_{IN} \times \frac{T_{ON}}{T_{TOTAL}} \qquad \text{EQ. 2}$$
$$= (V_{OUT} - V_{IN}) \times \frac{T_{OFF}}{T_{TOTAL}}$$

Based on equation 1 we can now substitute parts of equation 2 for duty factor D. With the substitutions for D we now have equation 3:

$$V_{IN} \times D = (V_{OUT} - V_{IN}) \times (1-D) \qquad \text{EQ. 3}$$

After simplifying equation 3 we have:

$$V_{IN} = V_{OUT}(1-D) \qquad \text{EQ. 4}$$

Since output voltage $V_{OUT}$ 124 is a substantially constant value due to output voltage regulation, we can replace output voltage $V_{OUT}$ 124 with a constant K.

$$V_{IN} = K(1-D) \qquad \text{EQ. 5}$$

Figure 2C:
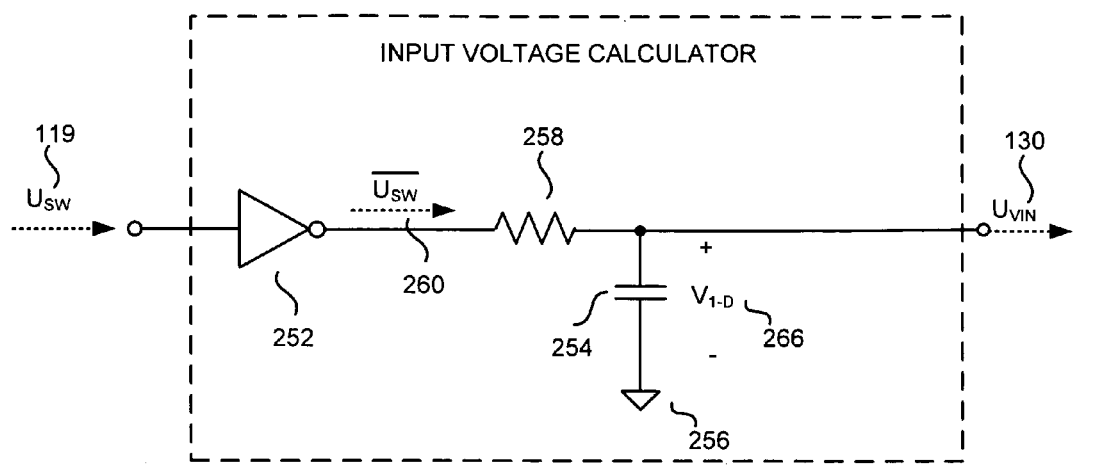
FIG. 2C is a functional block diagram illustrating a example input voltage calculator of FIG. 2B and further illustrates waveforms corresponding to an operation of the example input voltage calculator in accordance with the teachings of the present invention.
Figure 2C:
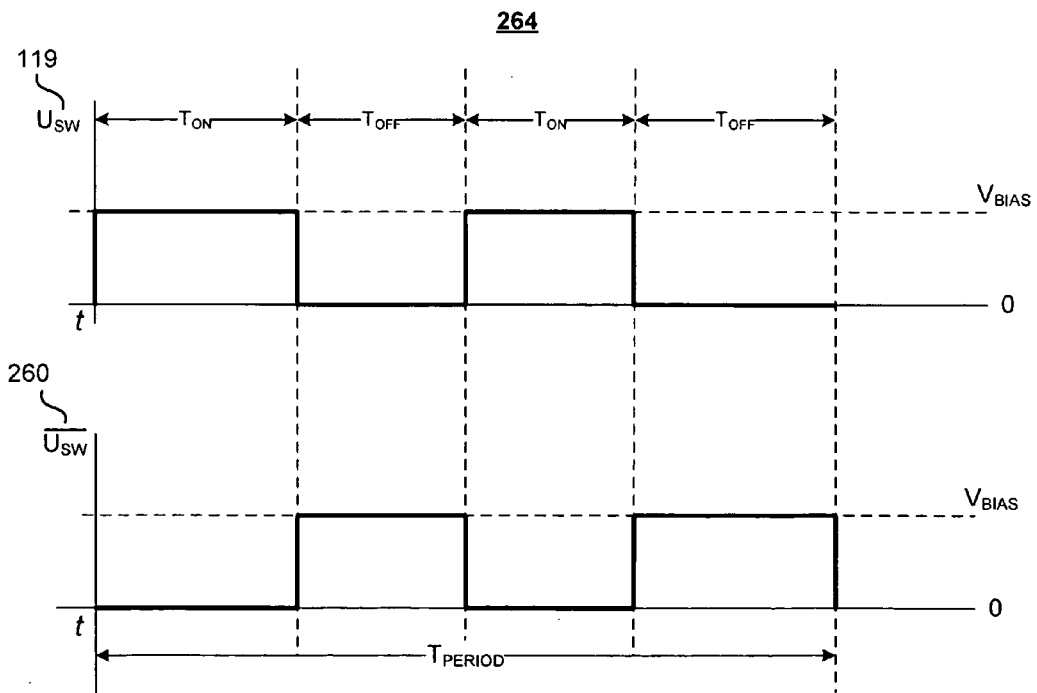

Therefore, input voltage calculator 250 may calculate the input voltage $V_{IN}$ 110 based on the duty factor D. More specifically, 1-D is representative of input voltage $V_{IN}$ 110. Since switching signal $U_{SW}$ 119 is representative of the conduction time of power switch $SW_1$ 118 over a certain time period, the duty factor D can be determined by switching signal $U_{SW}$ 119. Referring now to FIG. 2C, a functional block diagram of input voltage calculator 250 in FIG. 2B is illustrated in further detail. As shown, input voltage calculator 250 includes an inverter 252 coupled to an averaging capacitor 254 that is coupled to an input return 256. A scaling circuit 258 is coupled to capacitor 254.

In operation, inverter 252 receives switching signal $U_{SW}$ 119 and outputs an inverted switching signal $\overline{U_{SW}}$ 260. As shown in waveforms 264, the duty factor D may be calculated by dividing the overall on times $T_{ON}$ in the time period by the total time period $T_{PERIOD}$ and the value (1-D) may be calculated by dividing the overall off times $T_{OFF}$ in the period by the total time period $T_{PERIOD}$. Since averaging capacitor 254 continuously receives inverted switching signal $\overline{U_{SW}}$ 260, averaging capacitor voltage 266 is representative of an averaged value of 1-D. As shown, input voltage calculator 250 outputs input voltage signal $U_{VIN}$ 130 signal which may be a voltage or a current that is representative of the input voltage $V_{IN}$ 110.

Figure 2D:
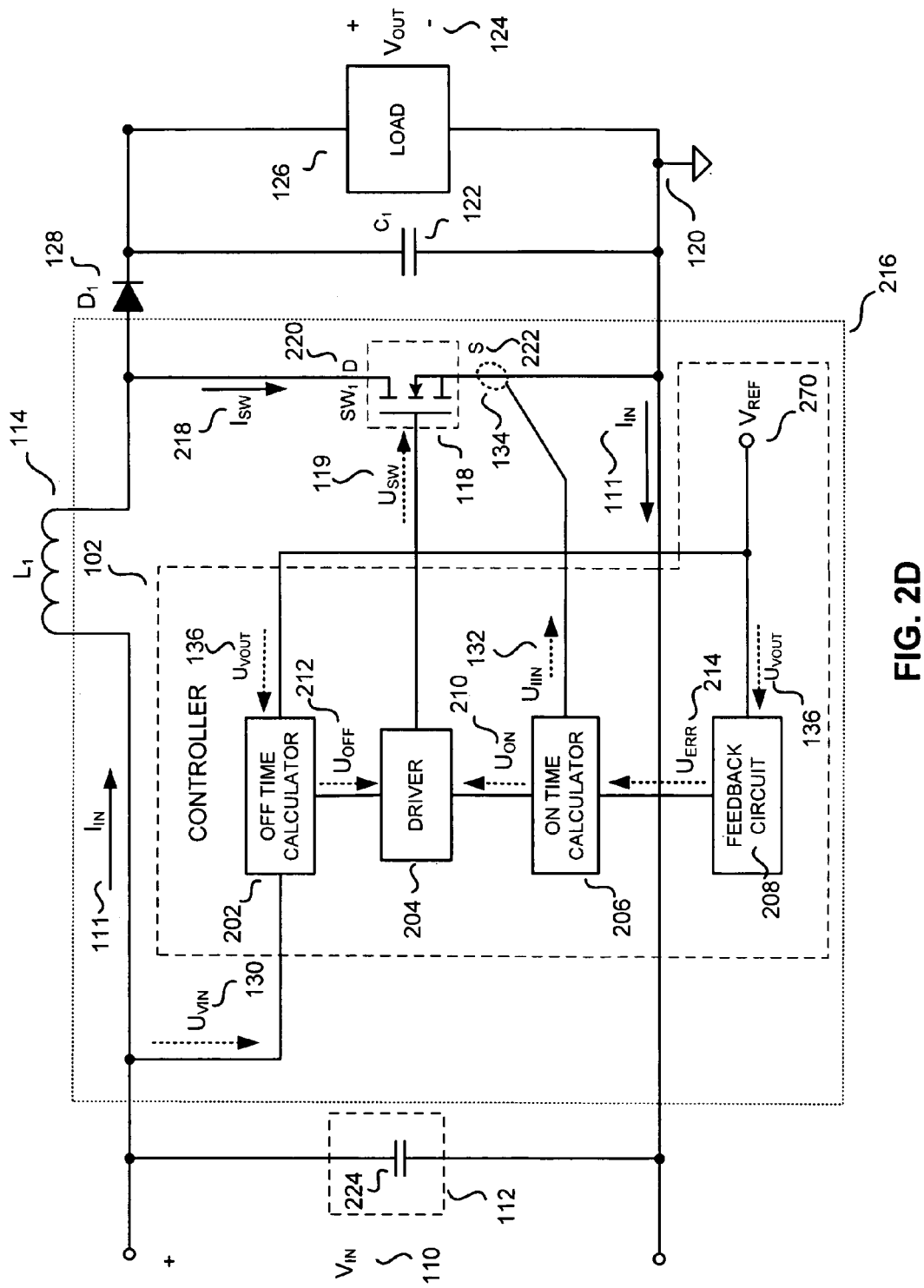
FIG. 2D is a functional block diagram illustrating an example controller of FIG. 1 in accordance with the teachings of the present invention.

Referring now to FIG. 2D, an alternate functional block diagram of the power converter 100 further illustrates an example of controller 102 of FIG. 1 in accordance with the teachings of the present invention. As shown, a constant reference voltage $V_{REF}$ 270 is representative of output voltage signal $U_{VOUT}$ 136. Since output voltage $V_{OUT}$ 124 is substantially constant due to regulation, constant reference voltage 270 may represent the output voltage $V_{OUT}$ 124. A benefit of using constant reference voltage as a representation of the output voltage is when the power converter 100 is not in regulation due to start up or a fault condition, power converter 100 does not have to wait for output voltage $V_{OUT}$ 124 to get back into regulation before the control technique according to the present invention can be implemented again.

As referenced previously, FIG. 3 illustrates AC line voltage waveform 302, DC input voltage waveform 304, DC input current waveform 306, and a switch current waveform 308 according to the teachings of the present invention. The AC line voltage waveform 302 is representative of AC line voltage $V_G$ 106 and is substantially a sinusoidal waveform. A line cycle is defined as the time intervals between three consecutive zero crossings of the AC line voltage waveform 302 and corresponds to a line cycle period $T_L$ 310 which is representative of the time it takes to complete one line cycle. More specifically, in the example shown, the line cycle period $T_L$ 310 is dependent on a frequency of the AC line voltage $V_G$ 106. For example, if the frequency of the AC line voltage $V_G$ 106 increases, the line cycle period $T_L$ 310 will become shorter. Conversely, if the frequency of the AC line voltage $V_G$ 106 decreases, the line cycle period $T_L$ 310 will become longer. According to the embodiments of the present invention, the line cycle period $T_L$ 310 is substantially longer than a switching cycle period $T_{SW}$ 312. To further illustrate, in one example the line frequency is 60 Hz which corresponds to a line cycle period $T_L$ 310 of 16,666 microseconds, and the switching frequency is 100 kHZ which corresponds to a switching cycle period $T_{SW}$ 312 of 10 microseconds.

As shown, DC input voltage waveform 304 is representative of DC input voltage $V_{IN}$ 110 and is the rectified waveform of the AC line voltage waveform 302. In operation, bridge rectifier 108 rectifies AC line voltage $V_G$ 106, represented by AC line voltage waveform 302, to generate DC input voltage $V_{IN}$ 110, represented by DC input voltage waveform 304. The DC input current waveform 306 is representative of DC input current $I_{IN}$ 111. As shown, the DC input current waveform 306 is superimposed on input voltage waveform 304 to illustrate how DC input current $I_{IN}$ 111 is controlled during the switching cycles to follow DC input voltage $V_{IN}$ 110. A magnified view 314 of the DC input current waveform 306 is shown in graph 330.

As shown in the magnified view 314, DC input current $I_{IN}$ 111 is controlled for a first switching cycle period $T_{SW1}$ 316 in response to a first on time $T_{ON1}$ 318 and a first off time $T_{OFF1}$ 320 that is determined by the controller 102. A switch current waveform 308 is representative of switch current $I_{SW}$ 218 of FIG. 2A. As shown, the switch current waveform 308 is substantially equal to the DC input current waveform 306 during the on time of a switching cycle such as for example during $T_{ON1}$ 318. The switch current waveform 308 is substantially zero during the off time of a switching cycle such as for example during $T_{OFF1}$ 320. As discussed above, DC input current $I_{IN}$ 111 is substantially equal to the switch current $I_{SW}$ 218 when switch $SW_1$ 118 is on. Therefore, either switch current $I_{SW}$ 218 or DC input current $I_{IN}$ 111 may be received by on time calculator 206 to determine the on time of the switching cycle period $T_{SW}$ 312.

Figure 4:
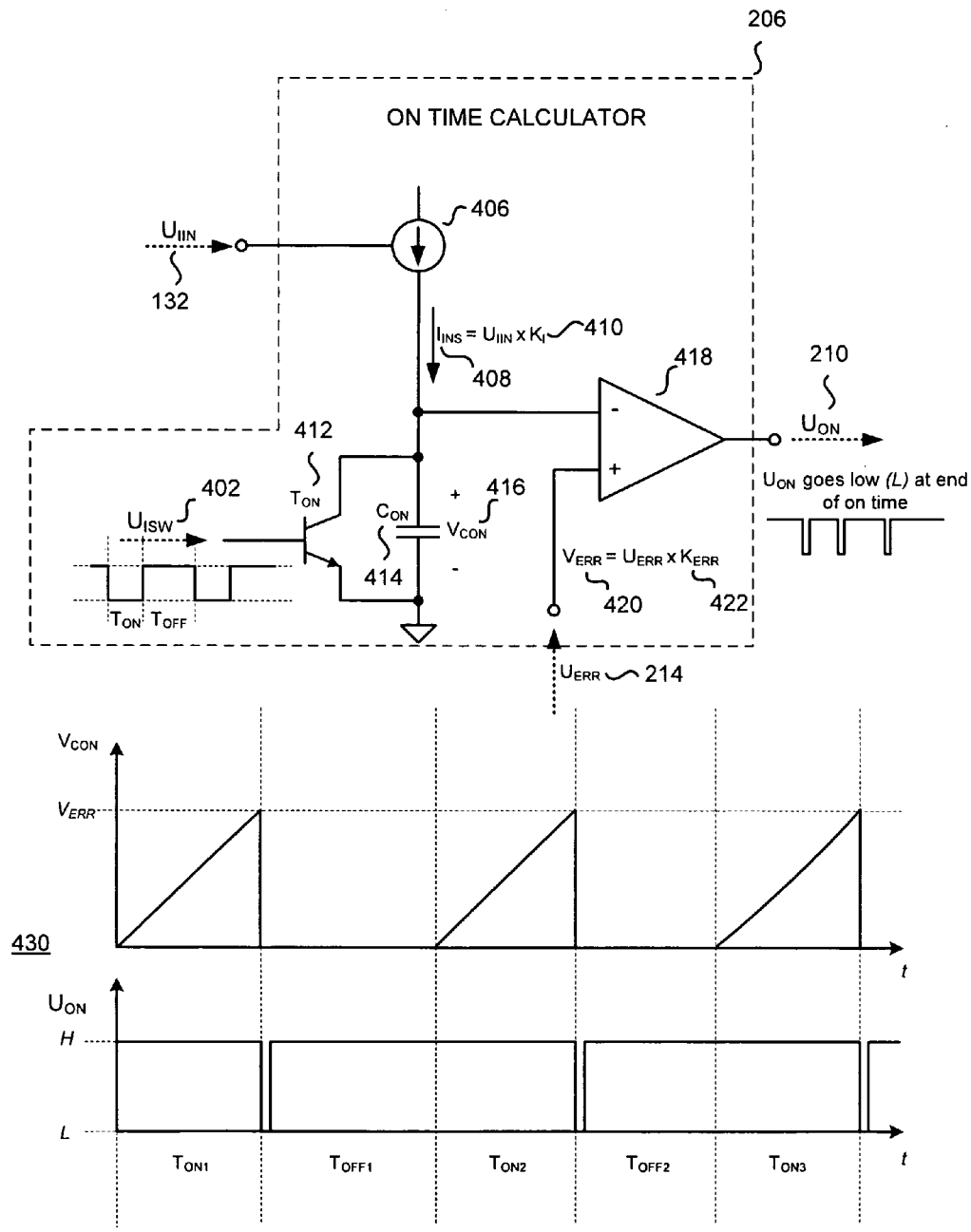
FIG. 4 is a functional block diagram of an example on time calculator included in the example controller of FIG. 1 and illustrates waveforms corresponding to an operation of the example on time calculator in accordance with the teachings of the present invention.

Referring now to an example shown in FIG. 4, the on time calculator 206 of FIG. 2A determines the on time of the switching cycle period $T_{SW}$ 312 by integrating DC input current $I_{IN}$ 111. In operation, on time calculator 206 outputs an on time signal $U_{ON}$ 210 in response to input current signal $U_{IIN}$ 132 and an inverted switching signal $U_{ISW}$ 402. Inverted switching signal $U_{ISW}$ 402 is one example of inverted switching signal $\overline{U_{SW}}$ 260 as shown in FIG. 2C. In the example of FIG. 4, an on time current source 406 outputs a scaled current $I_{INS}$ 408 representative of DC input current $I_{IN}$ 111 in response to input current signal $U_{IIN}$ 132. In one example, scaled current $I_{INS}$ 408 may be determined by multiplying input current signal $U_{IIN}$ 132 by a scaling factor $K_I$ 410 for signal processing. As shown in the example, a transistor $T_{ON}$ 412 is coupled across a capacitor $C_{ON}$ 414. In operation, when switch $SW_1$ 118 transitions from an off state to an on state, inverted switching signal $U_{ISW}$ 402 transitions from high to low, turning transistor $T_{ON}$ 412 off and allowing scaled input current $I_{INS}$ 408 to charge capacitor $C_{ON}$ 414.

Conversely, when switch $SW_1$ 118 transitions from an on state to an off state, inverted signal $U_{ISW}$ 402 transitions from low to high and turns on transistor $T_{ON}$ 412 thereby allowing capacitor $C_{ON}$ 414 to discharge. When switch $SW_1$ 118 is in an on state, capacitor $C_{ON}$ 414 charges and a capacitor voltage $V_{CON}$ 416 develops across capacitor $C_{ON}$ 414. A comparator 418 is coupled such that an inverting input of comparator 418 is at a same potential voltage as capacitor $C_{ON}$ 414. In the example, the non-inverting input of comparator 418 is coupled to a reference error voltage $V_{ERR}$ 420. More specifically, the reference error voltage $V_{ERR}$ 420 is representative of error signal $U_{ERR}$ 214. Therefore, in the example shown, the on time signal $U_{ON}$ 210 is determined in response to the error signal $U_{ERR}$ 214 received by on time calculator 206 and output by feedback circuit 208 of FIG. 2A. In one example, the error signal $U_{ERR}$ 214 is representative of the output voltage $V_{OUT}$ 124 at the output of power converter 100 and may be multiplied by a scaling factor $K_{ERR}$ 422 to determine the reference error voltage $V_{ERR}$ 420.

In operation, when switch $SW_1$ 118 is on, scaled input current $I_{INS}$ 408 charges capacitor $C_{ON}$ 414. In one example, a duration of an on-state is limited to when DC input current $I_{IN}$ 111 reaches a peak current threshold. When capacitor voltage $V_{CON}$ 416 equals reference error voltage $V_{ERR}$ 420, on time signal $U_{ON}$ 210 transitions low which indicates that switch $SW_1$ 118 should turn off. In this manner, capacitor $C_{ON}$ 414 is used to perform an integrating function and integrate DC input current $I_{IN}$ 111 to determine the on time of a switching cycle.

As shown, an example graph 430 illustrates the capacitor voltage $V_{CON}$ 416 with respect to the on time signal $U_{ON}$ 210. When the capacitor voltage $V_{CON}$ 416 reaches the reference error voltage $V_{ERR}$ 420, the on time signal $U_{ON}$ 210 transitions low until the capacitor $C_{ON}$ 414 is discharged below the reference error voltage $V_{ERR}$ 420. Once capacitor voltage $V_{CON}$ 416 is below reference error voltage $V_{ERR}$ 420, on time signal $U_{ON}$ 210 transitions back to high. Thus, in the example shown, the switch $SW_1$ 118 is turned off when on time signal $U_{ON}$ 210 transitions low.

Figure 5:
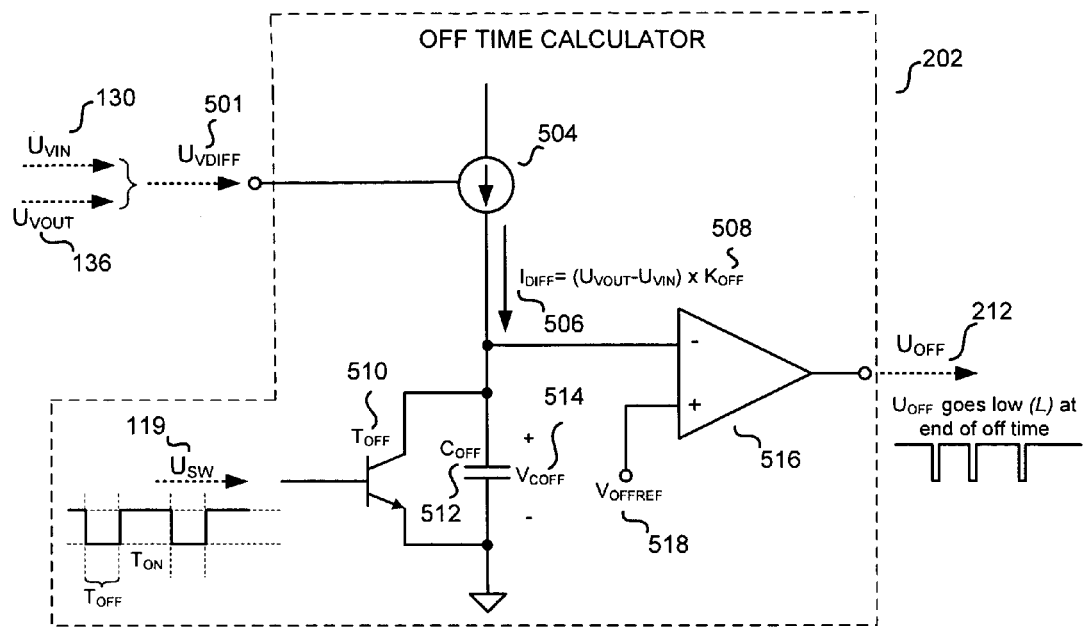
FIG. 5 is a functional block diagram of an example off time calculator included in the example controller of FIG. 1 and illustrates example waveforms corresponding to an operation of the off time calculator in accordance with the teachings of the present invention.
Figure 5:
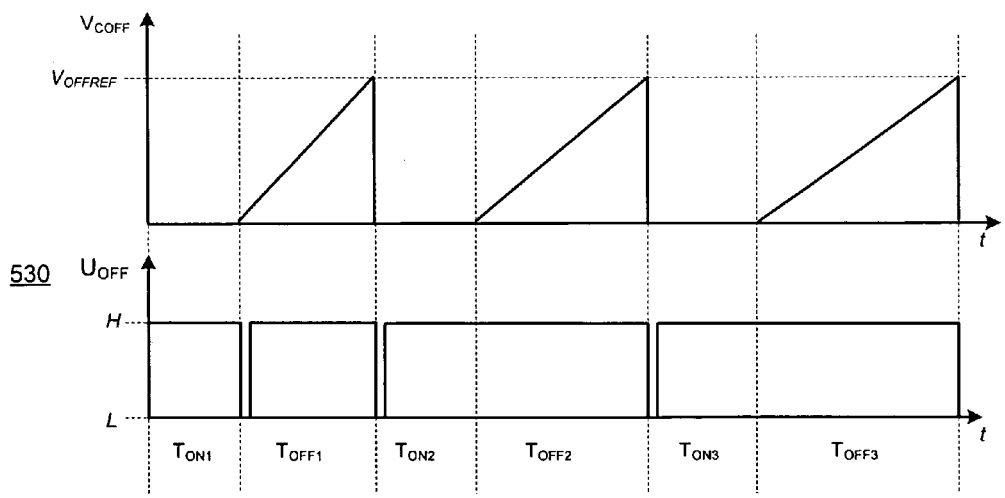

Referring now to FIG. 5, the off time calculator 202 of FIG. 2A determines the off time of a switching cycle by integrating a difference between the output voltage $V_{OUT}$ 124 and DC input voltage $V_{IN}$ 110 in accordance with the teachings of the present invention. More specifically in the example, off time calculator 202 outputs an off time signal $U_{OFF}$ 212 in response to a voltage difference signal $U_{VDIFF}$ 501 which is substantially equal to a difference between sensed output voltage signal $U_{VOUT}$ 136 and sensed input voltage signal $U_{VIN}$ 130. An off time current source 504 outputs a current $I_{DIFF}$ 506 representative of a difference between output voltage $V_{OUT}$ 124 and DC input voltage $V_{IN}$ 110. In one example, current $I_{DIFF}$ 506 may be determined by multiplying the difference between input voltage signal $U_{VIN}$ 130 and output voltage signal $U_{VOUT}$ 136 by a scaling factor $K_{OFF}$ 508 for signal processing. As shown, a transistor $T_{OFF}$ 510 is coupled across a capacitor $C_{OFF}$ 512.

In operation, in the example of FIG. 5, when switch $SW_1$ 118 transitions from an on state to an off state, switching signal $U_{SW}$ 119 transitions from high to low and turns off transistor $T_{OFF}$ 510 thereby allowing current $I_{DIFF}$ 506 to charge capacitor $C_{OFF}$ 512. Conversely, when switch $SW_1$ 118 transitions from an off state to an on state, switching signal $U_{SW}$ 119 transitions from low to high and turns on transistor $T_{OFF}$ 510, thereby allowing capacitor $C_{OFF}$ 512 to discharge. In one example, alternative signals may be used to switch transistor $T_{OFF}$ 510 on and off in accordance with the teachings of the present invention. When switch $SW_1$ 118 is in an off state, capacitor $C_{OFF}$ 512 is charging and a capacitor voltage $V_{COFF}$ 514 develops across capacitor $C_{OFF}$ 512. A comparator 516 is coupled such that an inverting input of comparator 516 is at a same potential voltage as capacitor $C_{OFF}$ 512. A non-inverting input of comparator 516 is coupled to a voltage reference $V_{OFFREF}$ 518. In one example, reference value $V_{OFFREF}$ 518 may be any reference value selected in accordance with design parameters of the power converter 100. In one example, the reference value $V_{OFFREF}$ 518 may be selected to determine a range of a switching frequency that is optimal for a design of the power converter 100.

In one example operation, when switch $SW_1$ 118 is off, current $I_{DIFF}$ 506 charges capacitor $C_{OFF}$ 512. When capacitor voltage $V_{COFF}$ 514 equals reference voltage $V_{OFFREF}$ 518, off time signal $U_{OFF}$ 212 transitions from high to low to indicate to switch $SW_1$ 118 to transition from an off state to an on state. In this manner, capacitor $C_{OFF}$ 512 is used to perform an integrating function, to integrate the difference between output voltage $V_{OUT}$ 124 and DC input voltage $V_{IN}$ 110 in order to determine the off time of switch $SW_1$ 118. By holding the off time's volt-seconds constant, the off time will vary in response to the change in DC input voltage $V_{IN}$ 110. More specifically, as the DC input voltage $V_{IN}$ 110 increases the off time of the switching cycle will increase According to an alternate embodiment of the present invention, current $I_{DIFF}$ 506 may be represented by a substantially constant value minus the DC input voltage $V_{IN}$ 110. In one example, the substantially constant value chosen may be based on design parameters of power converter 100. For example, as the constant value used to determine current $I_{DIFF}$ 506 increases, a duration of switching periods of power converter 100 will decrease. An additional benefit of determining current $I_{DIFF}$ 506 by subtracting DC input voltage $V_{IN}$ 110 from a constant instead of subtracting DC input voltage $V_{IN}$ 110 from a substantially constant output voltage $V_{OUT}$ 124 is the control technique in accordance with the teachings of the present invention can be implemented immediately as discussed above in conjunction with FIG. 2D. When current $I_{DIFF}$ 506 is determined based on a difference between a substantially constant output voltage $V_{OUT}$ 124 and DC input voltage $V_{IN}$ 110, a time delay is necessary when output voultage signal is determined from directly sensing the output voltage $V_{OUT}$ 124 as shown in FIG. 2A, in accordance with the teachings of the present invention. More specifically, the time delay occurs during start up and is required in order to allow for the initial charging of bulk capacitor $C_1$ 122 of FIG. 2A so that output voltage $V_{OUT}$ 124 is substantially constant. As a result, in various embodiments, output voltage $V_{OUT}$ 124 may have to reach its regulation value and be substantially constant before implementing the control technique in accordance with the present invention. When output voltage $V_{OUT}$ 124 is determined by a constant value the time delay is not required.

As shown, an example graph 530 illustrates the capacitor voltage $V_{COFF}$ 514 with respect to the off time signal $U_{OFF}$ 212. In the example, when the capacitor voltage $V_{COFF}$ 514 reaches the reference voltage $V_{OFFREF}$ 518, the off time signal $U_{OFF}$ 212 transitions to low until capacitor $C_{OFF}$ 512 discharges below the reference voltage $V_{OFFREFF}$ 518. Once capacitor voltage $V_{COFF}$ 514 is below reference voltage $V_{OFFREFF}$ 518, off time signal $U_{OFF}$ 212 transitions back to high. Thus, the switch $SW_1$ 118 is signaled to turn on when off time signal $U_{OFF}$ 212 transitions low, in accordance with the teachings of the present invention.

Figure 6:
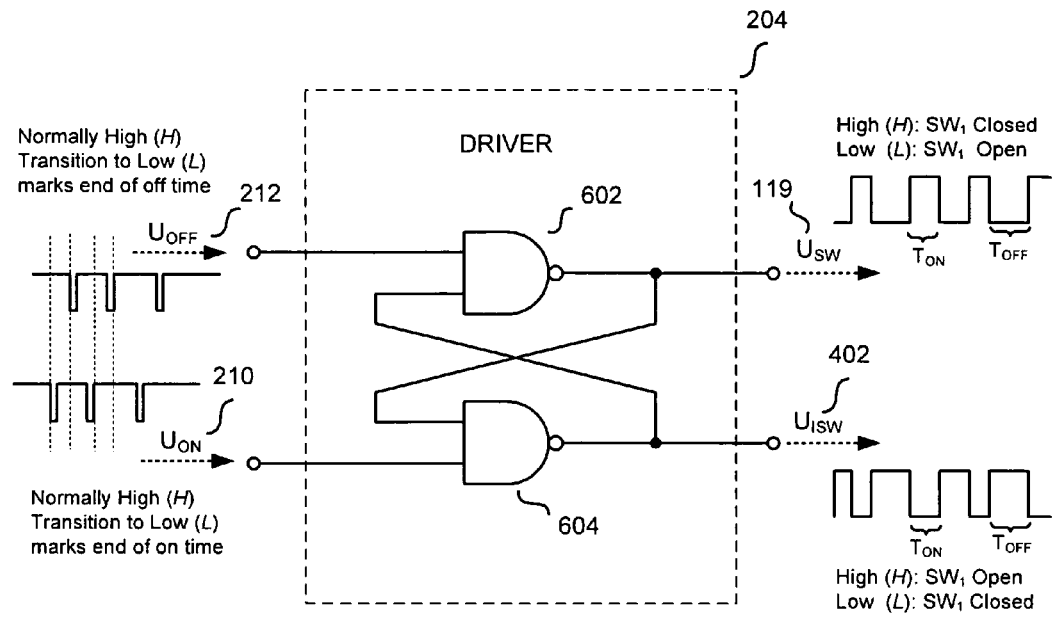
FIG. 6 is a functional block diagram of an example driver included in the controller of FIG. 1 and illustrates example waveforms associated with the operation of the example driver in accordance with the teachings of the present invention.
Figure 6:
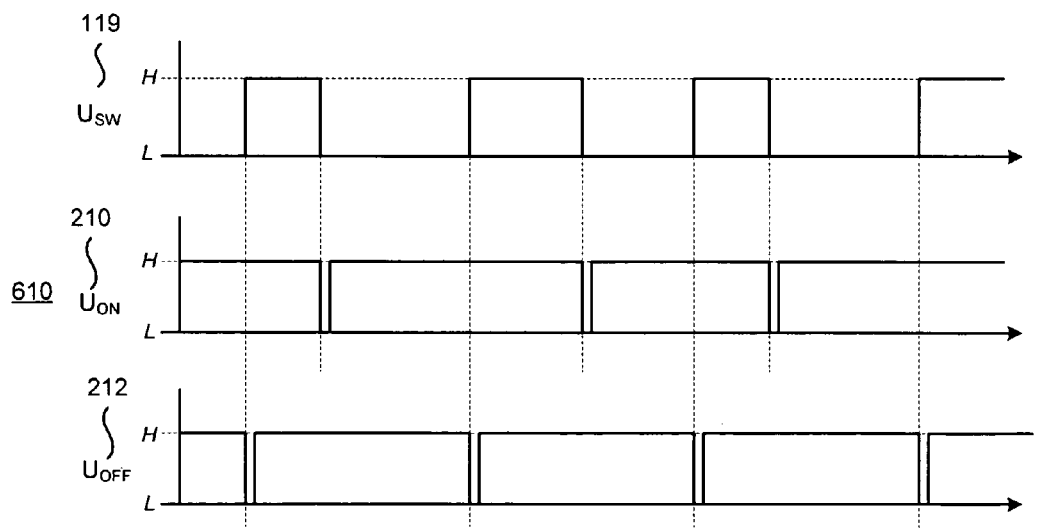

Referring now to an example shown in FIG. 6, the driver 204 controls the switching of switch $SW_1$ 118 by outputting switching signal $U_{SW}$ 119. In one example, switching signal $U_{SW}$ 119 is high when switch $SW_1$ 118 is closed, and switching signal $U_{SW}$ 119 is low when switch $SW_1$ 118 is open. The driver 204 receives on time signal $U_{ON}$ 210 to determine the end of an on time of a switching cycle and receives off time signal $U_{OFF}$ 212 to determine the end time of an off time of a switching cycle.

According to the example embodiment of the present invention, driver 204 is configured as a basic Reset/Set ("RS") NAND latch that includes a first NAND gate 602 and a second NAND gate 604. As shown, a graph 610 shows a relationship between the switching signal $U_{SW}$ 119, the on time signal $U_{ON}$ 210, and the off time signal $U_{OFF}$ 212. According to graph 610, in one example, the switching signal 119 transitions high (switch $SW_1$ 118 turns on) when off time signal $U_{OFF}$ 212 momentarily transitions low. Similarly, the switching signal $U_{SW}$ 119 transitions low (switch $SW_1$ 118 turns off) when on time signal $U_{ON}$ 210 momentarily transitions low.

Figure 7:
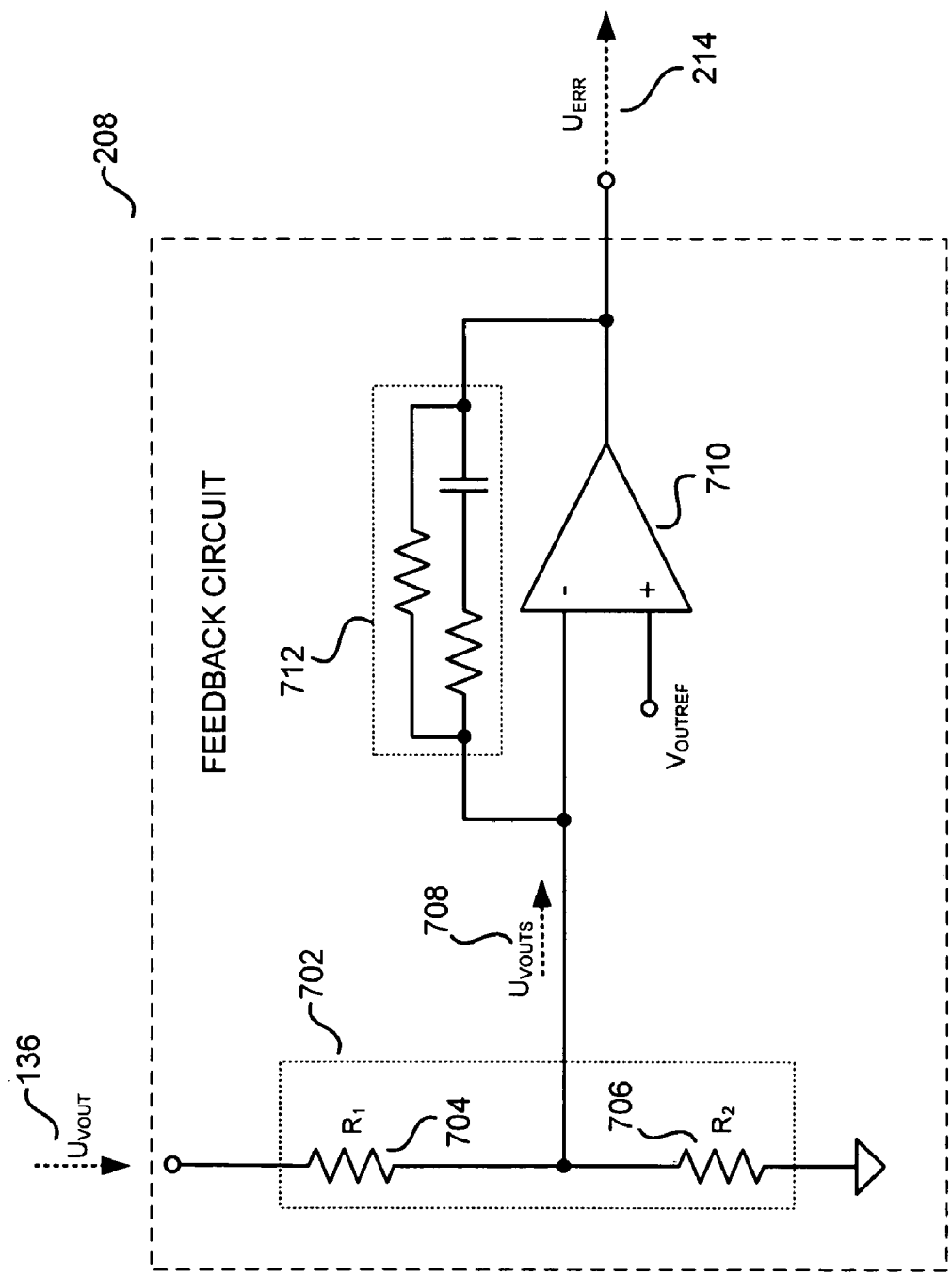
FIG. 7 is a functional block diagram of an example feedback circuit included in the example controller of FIG. 1 in accordance with the teachings of the present invention.

Referring now to an example shown in FIG. 7, feedback circuit 208 outputs error signal $U_{ERR}$ 214 in response to output voltage signal $U_{VOUT}$ 136. More specifically, error signal $U_{ERR}$ 214 gives an indication of the output voltage of the power converter 100, such as for example whether the output voltage $V_{OUT}$ 124 is higher or lower than a reference value. In operation, in the example, output voltage signal $U_{VOUT}$ 136, representative of output voltage $V_{OUT}$ 124, is scaled by a voltage divider network 702 comprising a first resistor $R_1$ 704 and a second resistor $R_2$ 706 to generate a scaled output voltage signal $U_{VOUTS}$ 708 at an inverting input of an error amplifier 710. In the example of FIG. 7, a gain setting filter 712, is used to slow the response of error signal $U_{ERR}$ 214. More specifically, in this example, error signal $U_{ERR}$ 214 is substantially non-responsive to AC time variances in the output voltage $V_{OUT}$ 124 over a line cycle. It can also be assumed that error signal $U_{ERR}$ 214 is substantially constant over multiple switching cycles. This allows for the on time adjust in response to the input voltage thus shaping the input current waveform 306 to follow the input voltage waveform 304 as shown in FIG. 1.

Figure 8:
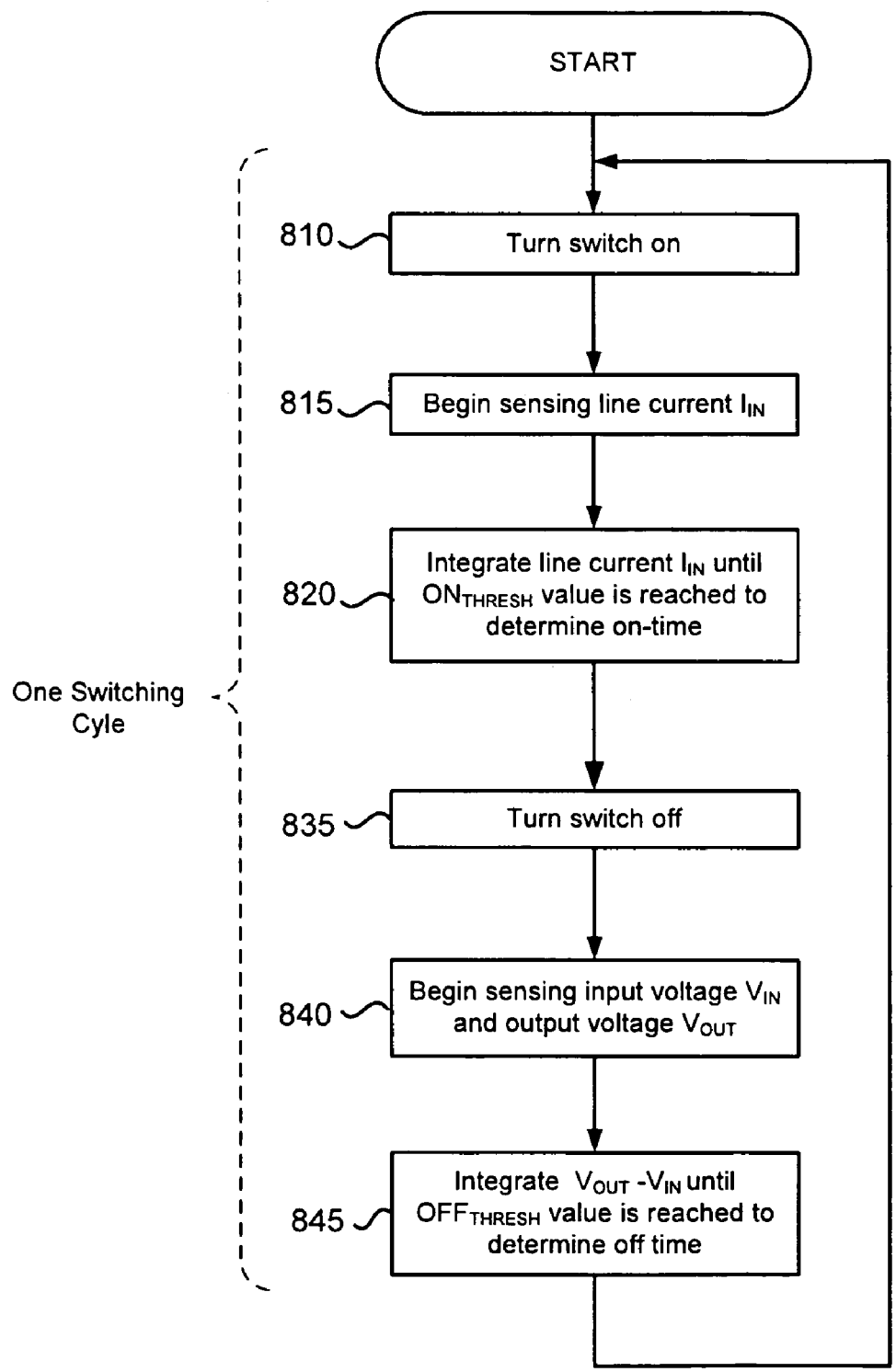
FIG. 8 is a flow diagram illustrating an example method for reducing line current harmonics by varying an on time and an off time of a switching cycle in accordance with the teachings of the present invention.

FIG. 8 is a flow diagram illustrating an example method for reducing line current harmonics according to the teachings of the present invention. In a process block 810, switch $SW_1$ 118 is turned on. Next, in a process block 815, DC input current $I_{IN}$ 111 is sensed. DC Input current $I_{IN}$ 111 is then integrated in a process block 820 to determine the on time of switch $SW_1$ 118. More specifically, in this example, the on time duration is determined by the time it takes for the integration of a line current, otherwise referred to as DC input current $I_{IN}$ 111, to reach the on time threshold value $ON_{THRESH}$. In a next process block 835, switch $SW_1$ 118 is turned off when integration of line current reaches on time threshold value $ON_{THRESH}$. Next, in the example, at a process block 840, DC input voltage $V_{IN}$ 110 and output voltage $V_{OUT}$ 124 are sensed. In a process block 845, a difference between output voltage $V_{OUT}$ 124 and DC input voltage $V_{IN}$ 110 are integrated to determine the off time of switch $SW_1$ 118. More specifically, in the example, the off time duration is determined in response to the time it takes for the integration of the difference between output voltage $V_{OUT}$ 124 and DC input voltage $V_{IN}$ 110 to reach the off time threshold value $OFF_{THRESH}$. In an alternate embodiment, process block 845 may include integrating a difference between a constant value and DC input voltage $V_{IN}$ 110 to determine the off time of switch $SW_1$ 118. After execution of decision block 845, the process may return to process block 810 to begin a next switching cycle.

Figure 9:
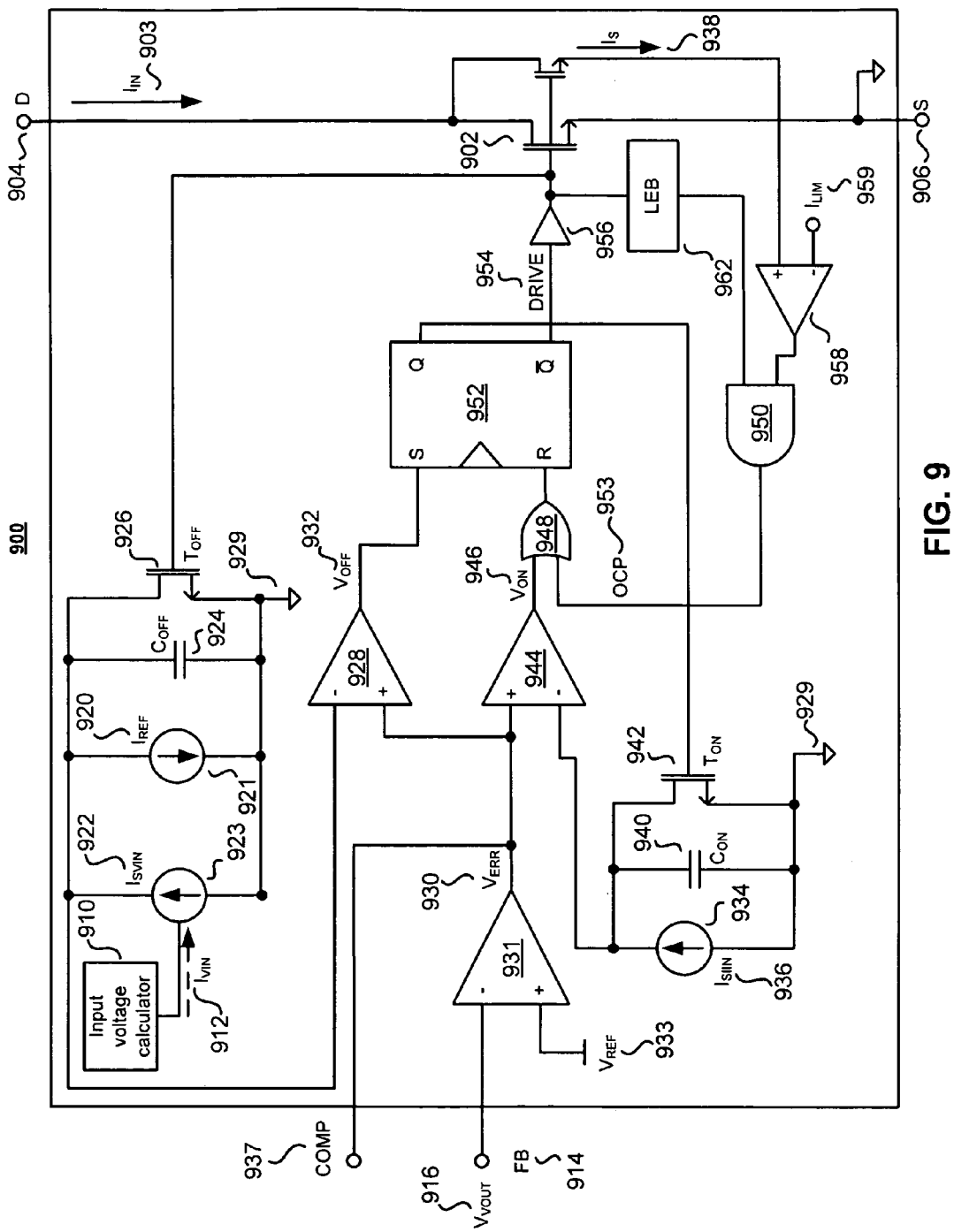
FIG. 9 illustrates an example integrated circuit that implements a control technique in accordance with the teachings of the present invention.

Referring now to FIG. 9, example internal details of an example integrated circuit 900 that implements a control technique in accordance with the teachings of the present invention is shown. In the example, a power MOSFET 902 switches between an on state and an off state to permit and prevent a flow of input current $I_{IN}$ 903 between a drain terminal D 904 and a source terminal S 906. A voltage terminal V 908 is coupled to an input voltage sense 910 that outputs a current $I_{VIN}$ 912 representative of a DC input voltage of a boost converter. A feedback terminal FB 914 receives a voltage $V_{VOUT}$ 916 representative of an output voltage at the output of the boost converter. In one example, voltage $V_{VOUT}$ 916 may be any constant value.

As shown, a reference current $I_{REF}$ 920 flows from a current source 921 in the opposite direction of a scaled current $I_{SVIN}$ 922 which flows from a current source 923. More specifically, scaled current $I_{SVIN}$ 922 is equal to current $I_{VIN}$ 912 multiplied by a scaling factor for signal processing. A capacitor $C_{OFF}$ 924 is coupled across a transistor $T_{OFF}$ 926. In operation, capacitor $C_{OFF}$ 924 charges when transistor $T_{OFF}$ 926 is off. More specifically, the current that charges capacitor $C_{OFF}$ 924 is the difference between reference current $I_{REF}$ 920 and scaled current $I_{SVIN}$ 922. When transistor $T_{OFF}$ 926 turns on, capacitor $C_{OFF}$ 924 discharges via a common return 929. A voltage comparator 928 is coupled to capacitor $C_{OFF}$ 924 such that a negative terminal of the comparator 928 is at a same potential voltage as the capacitor $C_{OFF}$ 924. When the voltage on capacitor $C_{OFF}$ 924 equals an error voltage $V_{ERR}$ 930, a voltage signal $V_{OFF}$ 932 transitions from low to high which results in power MOSFET 902 transitioning to an on state. In this manner, the off time of a switching cycle for power MOSFET 902 is controlled. More specifically, in one example, the capacitor $C_{OFF}$ 924 functions as an integrator that integrates a difference between a constant voltage and an input voltage of a power converter to determine the off time of a switching cycle.

In operation, in the example shown, the error voltage $V_{ERR}$ 930 is an output of error amplifier 931. In operation, error amplifier 931 compares voltage $V_{VOUT}$ 916 with a reference voltage $V_{REF}$ 933 to determine error voltage $V_{ERR}$ 930 which is representative of the output voltage at the output of a power converter. In one example, error voltage $V_{ERR}$ 930 may be output via a COMP terminal 937 to a gain setting filter that adjusts a response time of error voltage $V_{ERR}$ 930.

As shown in the example of FIG. 9, a current source 934 outputs a scaled current $I_{SIIN}$ 936 that is representative of a sensed input current $I_S$ 938 multiplied by a scaling factor for signal processing. A capacitor $C_{ON}$ 940 is coupled across a transistor $T_{ON}$ 942. In operation, scaled current $I_{SIIN}$ 936 charges capacitor $C_{ON}$ 940 when transistor $T_{ON}$ 942 is off. When transistor $T_{ON}$ 942 is on, capacitor $C_{ON}$ 940 discharges via common return 929. A voltage comparator 944 is coupled to capacitor $C_{ON}$ 940 such that a negative input of the comparator 944 is at the same potential voltage as the capacitor $C_{ON}$ 940. When the voltage on capacitor $C_{ON}$ 940 equals error voltage $V_{ERR}$ 930, a voltage signal $V_{ON}$ 946 at an output of comparator 944 transitions from a low signal to a high signal, which results in setting power MOSFET 902 to an off state. In this manner, the on time of a switching cycle for power MOSFET 902 is controlled. More specifically, the capacitor $C_{ON}$ 940 functions as an integrator that integrates an input current of a power converter to determine the on time of a switching cycle.

As shown in the example of FIG. 9, a first input of an OR gate 948 is coupled to the output of comparator 944 and a second input of OR gate 948 is coupled to an output of an AND gate 950. In operation, OR gate 948 outputs a high signal to reset (R) of latch 952 when the voltage signal $V_{ON}$ 946 transitions high or an over current protection (OCP) signal 953 transitions high. In operation, when reset input R of latch 952 receives a high signal, output Q is set high and complementary output Qbar is set low. Conversely, when voltage signal $V_{OFF}$ 932 transitions high, input S of latch 952 sets output Q low and complementary output Qbar is set high. In this manner, complementary output Qbar outputs a drive signal DRIVE 954 that controls a switching of power MOSFET 902. An amplifier 956, amplifies drive signal DRIVE 954 in order to supply adequate current to charge and discharge the gate of power MOSFET 902 to control the switching of power MOSFET 902.

As shown in the example, a current limit comparator 958 compares sensed input current $I_S$ 938 with a current limit reference $I_{LIM}$ 959. In one example, the output of current limit comparator 958 goes high when the sensed input current $I_S$ 938 reaches the current limit reference $I_{LIM}$ 959. More specifically, in this example, sensed input current $I_S$ 938 is a portion of input current $I_{IN}$ 903. In one example, sensed input current $I_S$ 938 is representative of input current $I_{IN}$ 903 in accordance with the teachings of present invention. Drive signal 954 is delayed by leading edge blanking (LEB) circuit 962 before being applied to the input of AND gate 950 to prevent the over current protection signal 953 from indicating a false current limit condition when power MOSFET 902 momentarily discharges stray capacitance as it turns on. More specifically, over current protection signal 953 indicates when the current in power MOSFET 902 has reached the current limit reference $I_{LIM}$ 959, to prevent damage to the power MOSFET 902 and/or any other internal components of integrated circuit 900.

Thus, in one example in accordance with teachings of the present invention, a method is disclosed for using a controller to reduce line current harmonics received from a power supply. In the example, a DC input current $I_{IN}$ 111 of power converter 100 is integrated to determine a time for switch $SW_1$ 118 in power converter 100 to transition from an on state to an off state. In one example, a difference between a constant value and DC input voltage $V_{IN}$ 110 of power converter 100 is integrated to determine a time for switch $SW_1$ 118 to transition from the off state to the on state. In another example, a difference between an output voltage $V_{OUT}$ 124 and DC input voltage $V_{IN}$ 110 is integrated to determine a time for switch $SW_1$ 118 to transition from the off state to the on state. In various examples, driver 204 is coupled to vary a switching frequency of switch $SW_1$ 118 to switch switch $SW_1$ 118 according to the time for switch $SW_1$ 118 to transition from the on state to the off state and the time for switch $SW_1$ 118 to transition from the off state to the on state to regulate output voltage $V_{OUT}$ 124 of power converter 100.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed:

1. A controller for use in a power converter, comprising:
    a first calculator coupled to determine an end of an on time of a power switch of the power converter by integrating an input current to output an on time signal representative of the end of the on time of the power switch; and
    a second calculator coupled to determine an end of an off time of the power switch by integrating a difference between an input voltage and an output voltage to output an off time signal representative of the end of the off time of the power switch.

2. The controller of claim 1 wherein the input current is an input current signal representative of an input current to the power converter and the input voltage is an input voltage signal representative of an input voltage of the power converter.

3. The controller of claim 1 wherein the output voltage is an output voltage signal that is substantially non-responsive to AC time variances in an output voltage at an output of the power converter.

4. The controller of claim 1 further comprising a driver circuit coupled to switch the power switch from an on state to an off state in response to the on time signal and to switch the power switch from the off state to the on state in response to the off time signal.

5. The controller of claim 4, wherein the driver circuit is coupled to control the switching of the power switch with a switching signal, the controller further comprising an input voltage calculator coupled to receive the switching signal and to output an input voltage signal in response to the switching signal, wherein the input voltage signal is representative of an input voltage of the power converter.

6. The controller of claim 5, wherein the input voltage calculator comprises an averaging capacitor coupled to output the input voltage signal in response to a duty factor of the switching signal.

7. The controller of claim 4 wherein the driver circuit regulates the output voltage at an output of the power converter.

8. The controller of claim 1 wherein the on time signal is determined in response to an error signal to be received by the first calculator.

9. The controller of claim 8 further comprising a feedback circuit to output the error signal to the first calculator, the error signal representative of the output voltage at an output of the power converter.

10. The controller of claim 9, wherein the feedback circuit generates the error signal in response to a constant reference voltage, wherein the constant reference voltage is representative of the output voltage of the power converter.

11. The power converter of claim 1 wherein the power switch comprises a metal oxide semiconductor field effect transistor (MOSFET).

12. A controller for use in a power converter to reduce line current harmonics, comprising:
    a first integrator coupled to integrate an input current of the power converter and to output a first signal to end an on time of a power switch in the power converter;
    a second integrator coupled to integrate a difference between a substantially constant value and an input voltage of the power converter to output a second signal to end an off time of the power switch; and
    a driver circuit coupled to receive the first and the second signals to output a third signal to vary the switching frequency of the power switch to control the input current to be substantially proportional to the input voltage.

13. The controller of claim 12 wherein the input current is controlled to be substantially linearly proportional to the input voltage.

14. The controller of claim 12 wherein the power converter is a boost converter.

15. The controller of claim 12 wherein the power switch comprises a metal oxide semiconductor field effect transistor (MOSFET).

16. The controller of claim 12 wherein the controller is included on a single monolithic device.

17. The controller of claim 12 wherein the power switch and the controller are included on a same single monolithic device.

18. A controller for use in a power converter, comprising:
    a first calculator coupled to determine an end of an on time of a power switch of the power converter by integrating an input current to output an on time signal representative of the end of the on time of the power switch; and
    a second calculator coupled to determine an end of an off time of the power switch by integrating a difference between a substantially constant value and an input voltage to output an off time signal representative of the end of the off time of the power switch.

19. The controller of claim 18 wherein the input current is an input current signal representative of an input current to the power converter and the input voltage is an input voltage signal representative of an input voltage of the power converter.

20. The controller of claim 18 further comprising a driver circuit coupled to switch the power switch from an on state to an off state in response to the on time signal and to switch the power switch from the off state to the on state in response to the off time signal.

21. A controller for use in a power converter to reduce line current harmonics, comprising:
    a first integrator coupled to integrate an input current of the power converter and to output a first signal to end an on time of a power switch in the power converter;
    a second integrator coupled to integrate a difference between an input voltage and an output voltage of the power converter to output a second signal to end an off time of the power switch; and
    a driver circuit coupled to receive the first and the second signals to output a third signal to vary the switching frequency of the power switch to control the input current to be substantially proportional to the input voltage.

22. The controller of claim 21 further comprising an off-time current source in the second integrator to output a current representative of the difference between the input and the output voltage of the power converter.

23. The controller of claim 21 wherein the driver circuit regulates the output voltage at an output of the power converter.

24. The controller of claim 21 wherein the power switch comprises a metal oxide semiconductor field effect transistor (MOSFET).

25. A method, comprising:
    integrating an input current of a power converter to determine a time for a power switch in the power converter to transition from an on state to an off state;
    integrating a difference between a constant value and an input voltage of a power converter to determine a time for the power switch to transition from the off state to the on state; and
    switching the power switch according to the time for the power switch to transition from the on state to the off state and the time for the power switch to transition from the off state to the on state to regulate an output voltage of the power converter.

26. The method of claim 25 wherein the switching of the power switch to regulate the output voltage of the power converter includes controlling the input current such that it is substantially linearly proportional to the input voltage.

27. The method of claim 25 wherein a duration of the on state is limited when the input current reaches a peak current threshold.

* * * * *